US012155282B2

(12) United States Patent
Gao et al.

(10) Patent No.: US 12,155,282 B2
(45) Date of Patent: Nov. 26, 2024

(54) STATOR WINDINGS WITH VARIABLE CROSS-SECTION FOR GEOMETRY OPTIMIZATION AND DIRECT COOLING

(71) Applicant: GM GLOBAL TECHNOLOGY OPERATIONS LLC, Detroit, MI (US)

(72) Inventors: Zhen Gao, Shanghai (CN); Yusheng Zou, Northville, MI (US); Jian Yao, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 191 days.

(21) Appl. No.: 17/684,589

(22) Filed: Mar. 2, 2022

(65) Prior Publication Data

US 2023/0268788 A1   Aug. 24, 2023

(30) Foreign Application Priority Data

Feb. 18, 2022  (CN) .......................... 202210150501.2

(51) Int. Cl.
| | |
|---|---|
| *H02K 3/24* | (2006.01) |
| *H02K 3/26* | (2006.01) |
| *H02K 9/193* | (2006.01) |
| *H02K 21/24* | (2006.01) |
| *B33Y 80/00* | (2015.01) |

(52) U.S. Cl.
CPC ................. *H02K 3/24* (2013.01); *H02K 3/26* (2013.01); *H02K 9/193* (2013.01); *H02K 21/24* (2013.01); *B33Y 80/00* (2014.12)

(58) Field of Classification Search
CPC ...... H02K 21/24; H02K 1/182; H02K 1/2793; H02K 3/24; H02K 9/193
See application file for complete search history.

(56) References Cited

U.S. PATENT DOCUMENTS

| | | | | |
|---|---|---|---|---|
| 5,325,007 | A  * | 6/1994 | Huss ........................ | H02K 3/46 310/43 |
| 5,982,069 | A  * | 11/1999 | Rao ........................ | H02K 9/197 310/201 |
| 2008/0179982 | A1* | 7/2008 | Kramer .................. | H02K 1/182 310/12.01 |
| 2011/0173800 | A1* | 7/2011 | Akimoto .................. | H02K 3/28 29/596 |

(Continued)

OTHER PUBLICATIONS

Office Action dated Dec. 20, 2022 from German Patent Office for German Patent Application No. 102022111250.0; 6 pages.

*Primary Examiner* — Tulsidas C Patel
*Assistant Examiner* — Robert E Mates (57) ABSTRACT

An axial flux motor includes: a stator having a first side and a second side opposite the first side, the stator including: N stator core components on the first side, where N is an integer greater than two; N stator windings that are disposed around the N stator core components, respectively, where each of the N stator windings includes, from a point of view facing the first side: a first width at a first location; and a second width that is greater than the first width at a second location that is radially outward from the first location relative to an axis; slot openings disposed between adjacent ones of the stator windings; and a rotor including a third side and M permanent magnets on the third side, where the first side is parallel to the third side, and where M is an integer greater than or equal to two.

19 Claims, 6 Drawing Sheets

(56) References Cited

U.S. PATENT DOCUMENTS

| | | | |
|---|---|---|---|
| 2013/0285487 A1* | 10/2013 | Pyrhonen | H02K 15/065 |
| | | | 310/54 |
| 2020/0136472 A1* | 4/2020 | Coldwate | H02K 15/022 |
| 2021/0152043 A1* | 5/2021 | Leonardi | H02K 1/16 |
| 2021/0320578 A1* | 10/2021 | Sheth | F04D 29/406 |
| 2021/0351658 A1 | 11/2021 | Jore et al. | |

* cited by examiner

STATOR WINDINGS WITH VARIABLE CROSS-SECTION FOR GEOMETRY OPTIMIZATION AND DIRECT COOLING

CROSS-REFERENCE TO RELATED APPLICATIONS

This application claims the benefit of Chinese Patent Application No. 202210150501.2, filed on Feb. 18, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric motors and more particularly to stator windings of electric motors.

Electric motors convert electrical energy into mechanical work by the production of torque, while electric generators convert mechanical work to electrical energy. Electric vehicles, including hybrid vehicles, include electric motors/generators, such as induction motors and permanent magnet motors, to propel the vehicles, as well as to capture braking energy when acting as an electric generator. Motors will be referred to herein; however, it will be understood that such principles also equally apply to generators.

Generally, an electric motor includes a rotor that rotates during operation and a stator that is stationary. The rotor may include a plurality of permanent magnets and rotates relative to the fixed stator. The rotor is connected to a rotor shaft that also rotates with the rotor. The rotor, including the permanent magnets, is separated from the stator by a predetermined air gap.

The stator includes conductors in the form of windings. When electrical energy is applied through the conductive windings, a magnetic field is generated. When electric energy is fed into the conductive windings of the stator, the power can be transferred over the air gap by a magnetic flux creating torque that acts on the permanent magnets in the rotor. In this manner, mechanical power can be transferred to the rotating rotor shaft. In a vehicle, the rotor transmits torque via the rotating shaft through a gear set to the drive wheels of the vehicle.

Two types of electric motors include radial flux and axial flux type motors. In a radial flux motor, the rotor and stator are typically situated in a concentric or nested configuration, so that when a stator is energized, it creates a magnetic flux that extends radially outwardly from the stator to the rotor. Thus, the conductive windings in the stator are typically arranged parallel to an axis of rotation so that a magnetic field is generated that is oriented in the radial direction from the axis of rotation (along the rotor shaft).

In an axial flux motor, a magnetic field parallel to an axis of rotation is produced by the electrically conductive wire windings in the stator, so the magnetic flux extends parallel to an axis of rotation (parallel to the rotor shaft). In some applications, axial flux motors are desirable because they are relatively lightweight, generate increased power, and have a compact size as compared to radial flux motors.

SUMMARY

In a feature, an axial flux motor includes: a stator having a first side and a second side opposite the first side, the stator including: N stator core components on the first side, where N is an integer greater than two; N stator windings that are disposed around the N stator core components, respectively, where each of the N stator windings includes, from a point of view facing the first side: a first width at a first location; and a second width that is greater than the first width at a second location that is radially outward from the first location relative to an axis through the stator; slot openings disposed between adjacent ones of the stator windings; and a rotor including a third side and M permanent magnets on the third side, where the first side is parallel to the third side, and where M is an integer greater than or equal to two.

In further features, each of the N stator windings further includes, from the point of view, a third width that is greater than the second width at a third location that is radially outward from the second location relative to the axis.

In further features, each of the N stator windings, from the point of view, increases in width in a direction radially outwardly from the axis.

In further features, the N stator windings are three dimensionally printed.

In further features, the N stator windings are rolled.

In further features, the N stator windings include coolant channels through the N stator windings.

In a feature, a system includes: the axial flux motor; and a pump configured to pump a coolant through the coolant channels.

In further features, a heat exchanger is configured to increase heat transfer away from the coolant.

In further features, the N stator core components include trapezoidal faces and a thickness between the trapezoidal faces.

In further features, the N stator core components are arranged in a circle around the axis.

In a feature, a vehicle includes the axial flux motor.

In a feature, a stator for an electric motor includes: a stator body having a first side and a second side opposite the first side; N stator core components disposed on the first side, where N is an integer greater than two; N stator windings that are disposed around the N stator core components, respectively, where each of the N stator windings includes, from a point of view facing the first side: a first width at a first location; and a second width that is greater than the first width at a second location that is radially outward from the first location relative to an axis through the stator body; and slot openings disposed between adjacent ones of the stator windings.

In further features, each of the N stator windings further includes, from the point of view, a third width that is greater than the second width at a third location that is radially outward from the second location relative to the axis.

In further features, each of the N stator windings, from the point of view, increases in width in a direction radially outwardly from the axis.

In further features, the N stator windings are three dimensionally printed.

In further features, the N stator windings are rolled.

In further features, the N stator windings include coolant channels through the N stator windings.

In a feature, a system includes the stator and a pump configured to pump coolant through the coolant channels.

In further features, the N stator core components include trapezoidal faces and a thickness between the trapezoidal faces.

In further features, the N stator core components are arranged in a circle around the axis.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present application involves stator windings for axial flux motors. The concepts apply not only to electric axial flux motors that generate mechanical energy from electrical energy, but also to axial flux generators that can generate electrical energy from mechanical energy. The present application is also applicable to other types of motors, such as radial flux motors.

Teeth of a stator define slots between adjacent ones of the teeth. Stator windings are disposed in the slots and around the teeth. The teeth may have identical shapes, and the shapes of the teeth may be such that the slots between adjacent teeth extend radially.

The present application involves three dimensionally (3D) printed stator windings with variable cross-section. When viewed from the front, the stator windings may increase in width moving radially outward. This increases the filling rate at the outer diameter side of the stator and decreases winding resistance, which decreases loss of the motor. As an alternative to 3D printing, the stator windings may be rolled.

In various implementations, the stator windings may include coolant channels. A coolant (fluid) can be circulated through the coolant channels of the stator windings to increase cooling of the axial flux motor. The coolant draws heat away from the windings and may reduce a winding loss of the axial flux motor.

Figure 1:
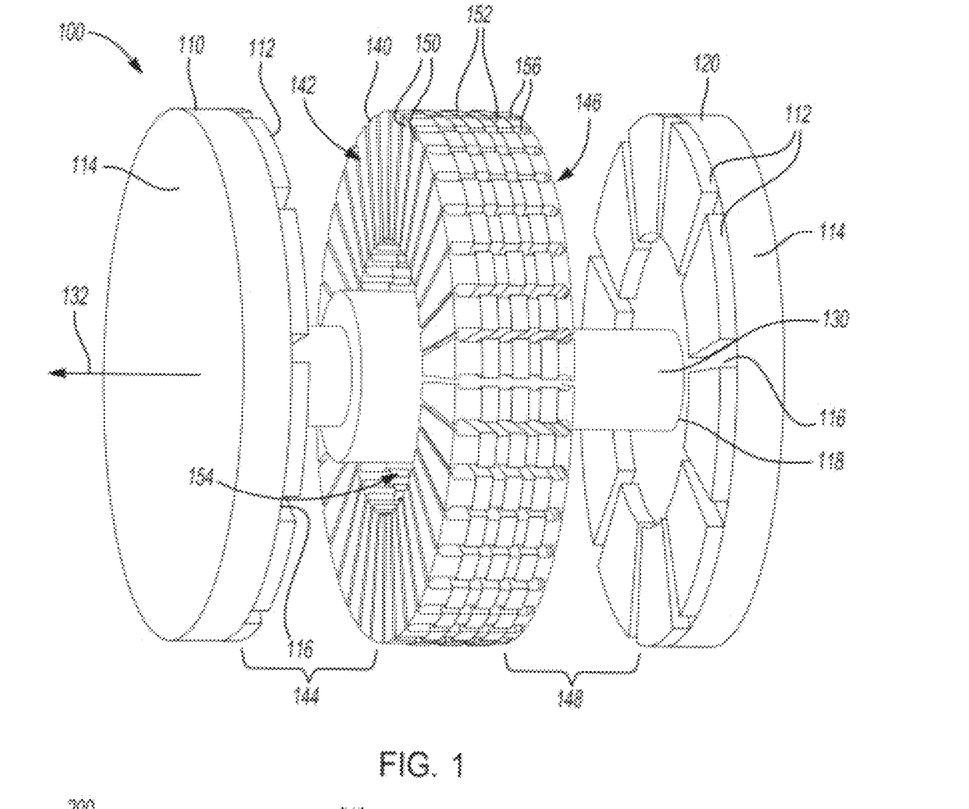
FIG. 1 shows an example axial flux motor having one stator and two rotors.

An exploded view of non-limiting example of an (electric) axial flux motor 100, also referred to as a pancake motor, is shown in FIG. 1. The axial flux motor 100 may be used, for example, in a vehicle or in another suitable type of device. In a vehicle, the motor 100 may be used, for example, to generate torque that can be transferred to one or more wheels of the vehicle and/or to convert kinetic energy from the one or more wheels into electrical energy (e.g., for regeneration).

The motor 100 includes a first rotor 110 and a second rotor 120 both connected to and configured to rotate about a rotor shaft 130. Both the first and second rotors 110 and 120 have an annular or disk shape with a centrally disposed aperture 118. The rotor shaft 130 passes through the centrally disposed aperture 118. The rotor shaft 130 defines a rotational axis 132 about which the rotors 110 and 120 turn.

A stator 140 is disposed between the first rotor 110 and the second rotor 120. The stator 140 may have an annular or circular disk shape body. The stator 140 is fixed and stationary, while the first and second rotors 110 and 120 rotate with the rotor shaft 130 during operation. A side of the first rotor 110 faces a first side 142 of the stator 140 and defines a first air gap 144 therebetween. The first side 142 of the stator 140 may reside along a first plane. A side of the second rotor 120 faces a second side 146 of the stator 140 and defines a second air gap 148 therebetween. The second side 146 of the stator 140 may reside along a second plane. The first and second planes may be parallel and may not intersect. While the example of the first and second planes is provided, the first and second sides 142 and 146 may include curves and or other non-planar shapes.

While the motor 100 is shown to have the one stator and two rotors, the present application is also applicable to other numbers of stators and/or rotors including multiple stators, a single rotor, or more than two rotors. For example, the present application is also applicable to motors with single-rotor motors, motors with a single-stator, motors with a single-rotor between two stators, and motors with one-stator between two rotors. The description also applies to these other embodiments. While not shown in FIG. 1, the motor 100 includes a housing, and the rotor(s), stator(s), and rotor shaft are disposed within the housing. The rotor shaft 130 typically extends through an aperture in the housing to outside of the housing. The housing may be fixed, for example, to a vehicle frame and the rotor shaft may be coupled to a gearbox, for example a reduction gearbox, within the vehicle.

The first rotor 110 and the second rotor 120 can have the same design or a similar design (facing in opposite directions towards the stator 140) and thus the common components will be described herein.

Each of the first rotor 110 and second rotor 120 includes a plurality of permanent magnets 112 affixed to a rotor body 114. The permanent magnets 112 may have alternating polarity. For example, one of the permanent magnets 112 may have a positive polarity, a next adjacent one of the permanent magnets 112 may have a negative polarity, a next adjacent one of the permanent magnets 112 may have a positive polarity, etc. The permanent magnets 112 are separated from one another by channels, such as channel 116. The channels 116 may extend radially along a face of the respective rotor. The permanent magnets 112 and the channel 116 may together define a plurality of magnetic poles.

The stator 140 includes a plurality of stator segments or core components 150 around which a plurality of electrically conductive windings 152 are disposed. The stator core components 150 are arranged in a circle around an axis (e.g., 132). The stator core components 150 may also be referred to as teeth. The stator 140 defines a plurality of slots 156 between the stator core components 150. Conductive windings 152 may extend over or bridge the slots 156. The stator 140 may be fixed and stationary. The conductive windings 152 are discussed further below. The conductive windings 152 may include, for example, copper, copper alloys, or another type of electrical conductor. The stator core components 150 may be a part of the body or may be attached to the body of the stator 140.

The rotor shaft 130 may pass through a centrally disposed aperture 154 in the stator 140 and be supported by one or more bearings that align the first and second rotors 110 and 120 with respect to the stator 140 while allowing rotation of the rotor shaft 130. The electrically conductive windings 152 of the stator 140 may be formed of copper configured to generate a magnetic field when current is applied so as to interact with magnetic fields of the plurality of permanent magnets 112 having alternating polarities located on the first and second rotors 110 and 120.

Different regions of the stator 140 may be selectively energized to impart a rotational force on the first and second rotors 110 and 120 causing the rotors 110 and 120 and the rotor shaft 130 to rotate with respect to the rotational axis 132. For example, the stator components 150 may be energized sequentially in a counterclockwise direction or a clockwise direction to impart rotation of the rotor shaft 130 clockwise or counterclockwise.

The motor 100 having a single stator 140 and first and second rotors 110, 120 may be used in high torque applications, including for use in an electric, fuel cell, or hybrid vehicle. In such implementations, a housing encasing the motor 100 may be fixed/attached to the vehicle frame and at least one output from an end of the rotor shaft 130 is coupled to a reduction gearbox or directly to the vehicle drive wheels. While the example of the motor 100 being implemented in a vehicle is provided, the present application is not limited to vehicle based examples.

Figure 2:
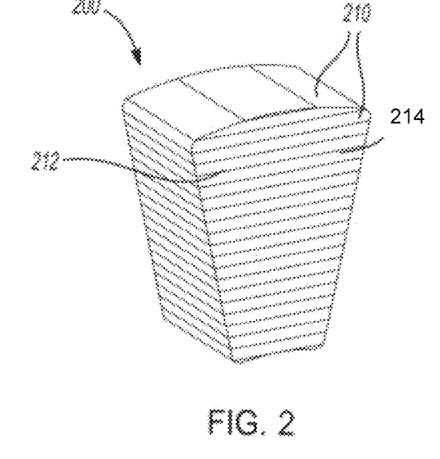
FIG. 2 shows a stator core component including a plurality of laminated layers.
Figure 3:
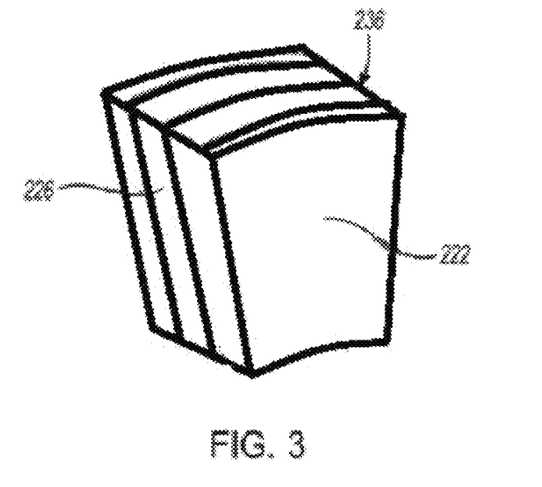
FIG. 3 shows a stator core component.
Figure 4:
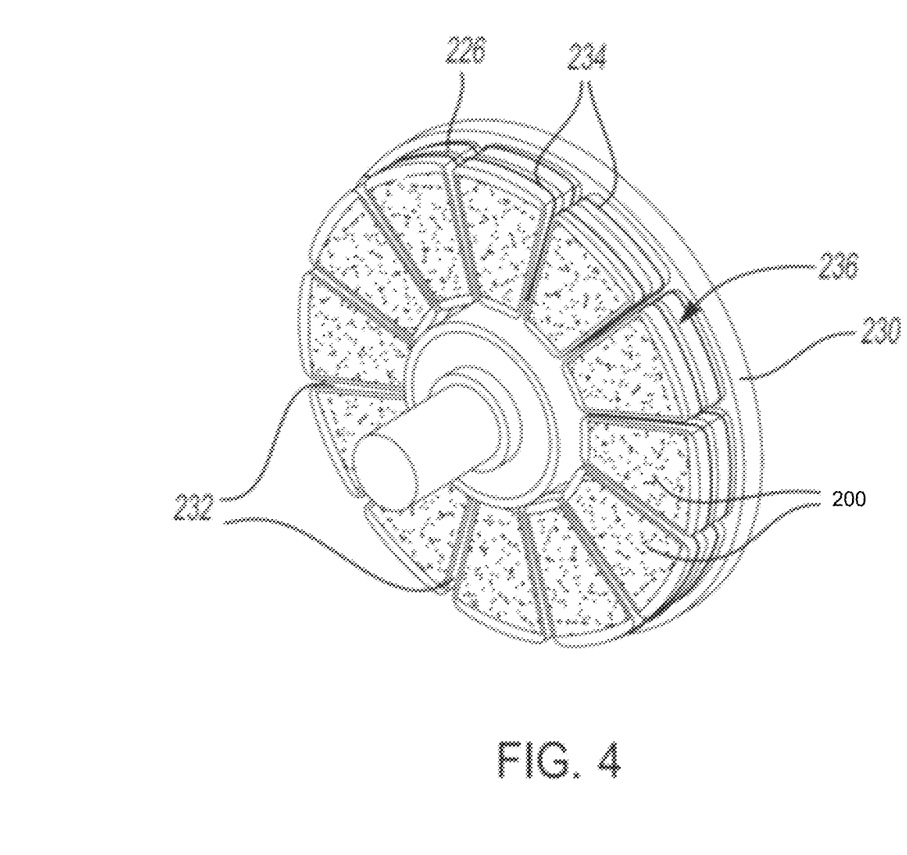
FIG. 4 shows a stator having a plurality of stator core components.

FIGS. 2-4 include example views of stator core components that can be used in a stator of an axial flux motor, such as the stator 140 of FIG. 1. As discussed above, the conductive windings 152 are disposed around the stator core components.

FIG. 2 shows a laminated stator core component 200 having a plurality of layers 210 of magnetic material, such as a ferromagnetic material like magnetic steel or another type of ferromagnetic material. Such magnetic material layers may be isolated from one another by an insulating material interleaved between the layers of the magnetic material. The laminated steel sheets may be punched, optionally annealed, and stacked in a manufacturing process to form a laminated stator core component. When multiple laminated stator core components are assembled together, they form a plurality of magnetizable poles.

As can be seen, the stator core component 200 may include an assembly of multiple distinct laminated layer structures or modules, which may have distinct orientations with respect to one another. In other aspects, the multiple laminated modules may have substantially the same orientation with respect to one another. While not shown in FIG. 2, each pole defined by a stator core component may have electrically conductive windings at least partially disposed around it. Such a laminated stator core component may have the advantage of reducing eddy currents and minimizing hysteresis when incorporated into the stator of an axial flux motor. While FIGS. 2 and 3 show an example shape of a stator core component, the present application is also applicable to other stator core component shapes. While the example of laminated stator core components is provided, the present application is also applicable to non-laminated stator core components.

As can be seen in FIG. 2, a first layer 212 has a first size defined by its length, width, and height (e.g., thickness), while a second layer 214 in the stack has a second size defined by its length, width, and height (e.g., thickness). The second size of the second layer 214 is necessarily smaller than the first size of the first layer 212 due to the substantially trapezoidal shape of stator core component 200.

Another option for forming the stator core components is shown in FIGS. 3-4, where each of the stator core components 200 is formed from a soft magnetic composite (SMC) material 222. SMC powders may include a soft magnetic material, the surface of which may be covered with an electrically insulating layer. These powders may be consolidated to form soft-magnetic components, for example, by pressing or another manner of consolidation. While the example of the stator core component 200 having trapezoidal faces with a thickness between the trapezoidal faces is provided, the stator core component 200 can have another suitable shape.

Each stator core component 200 includes a trapezoidal tooth 236. In various implementations, each stator core component may also include one or more pole shoes. The teeth 236 define lateral side regions 226. The regions 226 are slots, and each slot has two slot openings. The teeth 236 define slots and slot openings between adjacent teeth/stator core components.

FIG. 4 shows a plurality of stator core components 200 circumferentially assembled on a stator disc 230. Channels (slots) 232 are defined between the stator core components 200. As shown in FIG. 4, the regions 226 are configured to receive electrically conductive windings 234 disposed therein (e.g., by being disposed around at least a portion of an exterior of the stator core component 200). The slot openings are defined between the stator core components 200. The stator core components 200 formed of the SMC material 222 can be manufactured into a variety of different shapes. Therefore, different shapes of slot openings can be realized by changing the shapes of stator core components.

Figure 5:
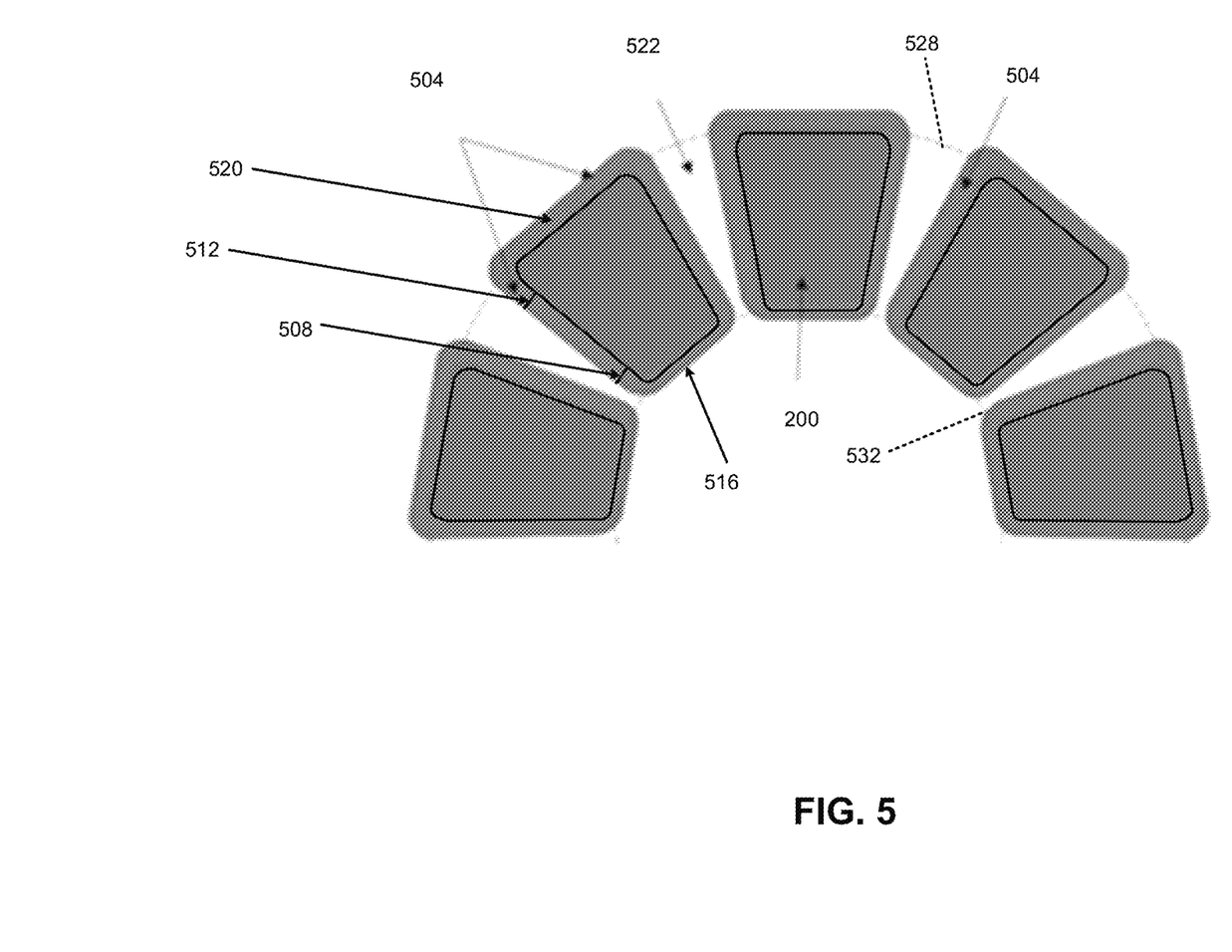
FIGS. 5 and 6 are front perspective views of stators looking toward stator core components.

FIG. 5 is a front perspective view looking toward stator core components 200 with windings 504 different than those claimed herein. The windings 504 could be wound around the stator core components 200 such as out of electrically conductive (e.g., copper) wire. With the windings 504 including windings of wire that are wound around the stator core components 200, the windings 504 have the same width around each of the stator core components 200. For example, a first width 508 of a winding at a radially inward (first) location is the same as a second width 512 at a radially outward (second) location. The first location is radially inward from the second location from the axis of rotation of the rotor(s). The width of the winding is also the same along the radially inner side 516 of the stator core components 200 and the radially outer side 520 of the stator core components 200. The width of each of the windings 504 being the same around the stator core components 200 results in a filling 522 of the slots increasing moving radially outward. Near an outer diameter 528 of the stator, a distance between the windings 504 around adjacent stator core components 200 is large and therefore the filling of the slots is relatively low. As illustrated, the distance between the windings 504 increases from an inner diameter 532 toward the outer diameter 528.

The present application involves the width of the windings being variable to increase the filling between windings of adjacent stator core components. This decreases winding resistance, improves motor efficiency, and increases heat conductivity.

Figure 6:
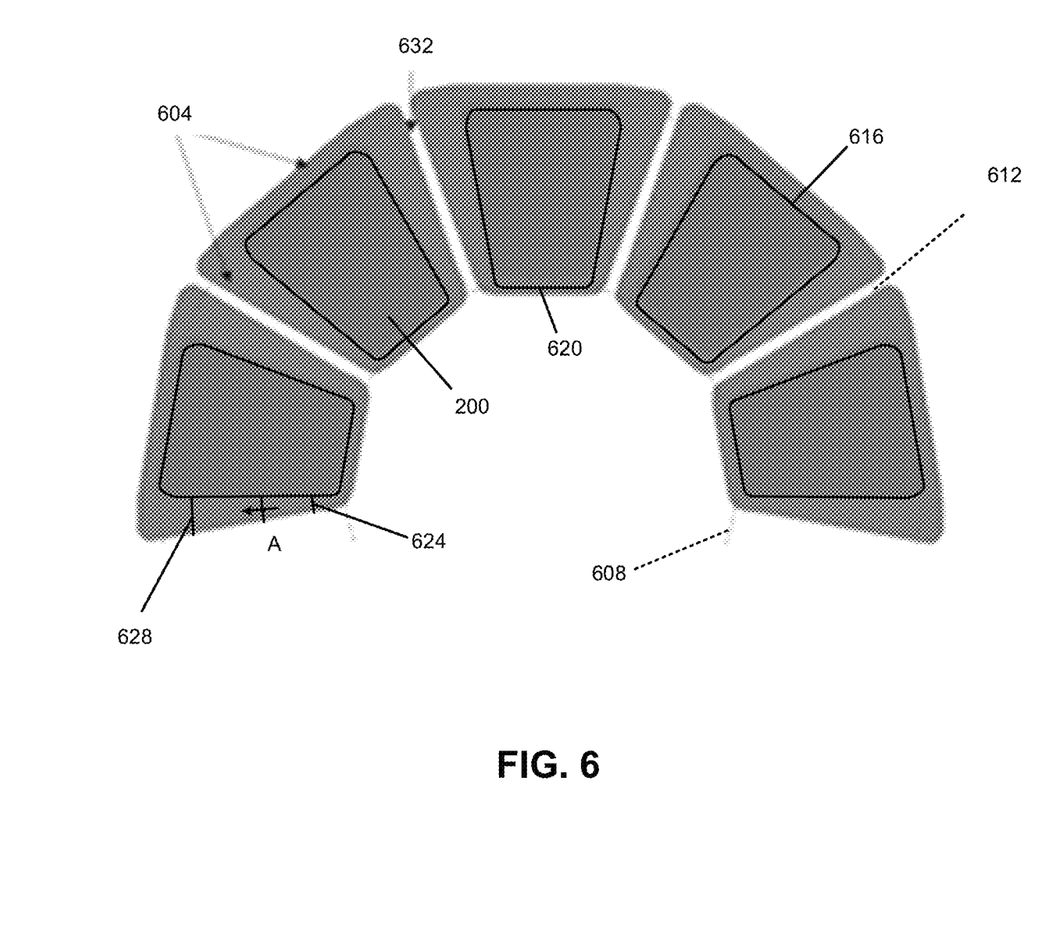

FIG. 6 is a front perspective view looking toward stator core components 200 with windings 604 with variable width. The inner diameter of the stator is illustrated by 608, and the outer diameter of the stator is illustrated by 612. The outer diameter 612 abuts radially outer edges 616 of the stator core components 200, and the inner diameter 608 abuts radially inner edges 620 of the stator core components 200.

A first width (e.g., radially) 624 of a winding at a first location that is radially inward of a second location is less than a second width 628 at the second location. In various implementations, the width of the winding may increase along the lateral sides of a stator core component moving radially outwardly. As illustrated by 632, this increases the filling between windings of adjacent stator core components 200. The increased filling decreases winding resistance, improves motor efficiency, and increases heat conductivity. As illustrated, the distance between the windings 604 may be the same from an inner diameter 608 toward the outer diameter 612.

The windings 604 may be, for example, three dimensionally (3D) printed using a 3D printer or rolled using one or more rollers. In the example of 3D printing, the windings 604 may be printed to include a hollow channel through the windings 604 for coolant flow.

Figure 7:
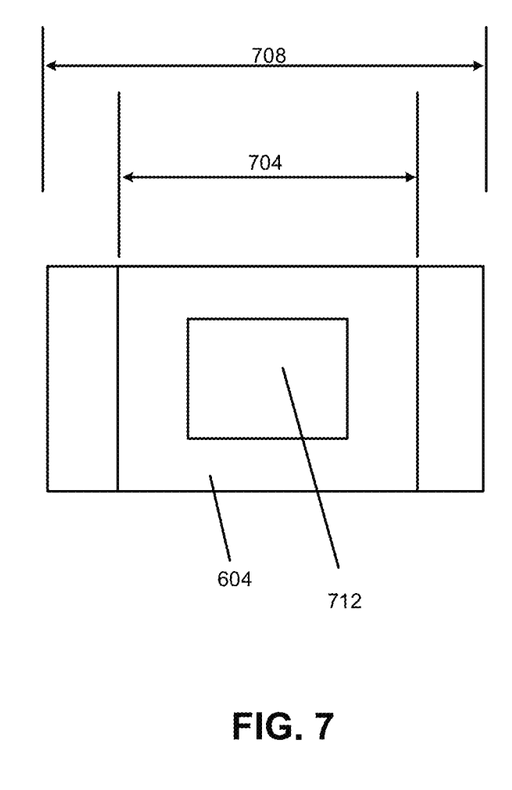
FIG. 7 is a cross sectional view of a portion of one of the windings looking radially outwardly from a radially inward location, such as from cross-section A of FIG. 6.

FIG. 7 is a cross sectional view of a portion of one of the windings 604 looking radially outwardly from a radially inward location, such as from cross-section A of FIG. 6. The winding 604 has a first width 704 at the radially inward location and a second width 708 at a radially outer location. As illustrated, the winding 604 can be 3D printed to include a channel 712 through which a coolant (e.g., oil, a gas, etc.) can be circulated to cool the stator windings and the stator. Cooling the windings 604 reduces a loss of the windings 604 and increases efficiency of the axial flux motor. 3D printing or rolling the windings also eliminates the stress that exists in wound wire windings. The windings 604 can be directly printed around the stator core components 200 or printed around molds of stator core components and, after printing, positioned around the stator core components 200.

Figure 8:
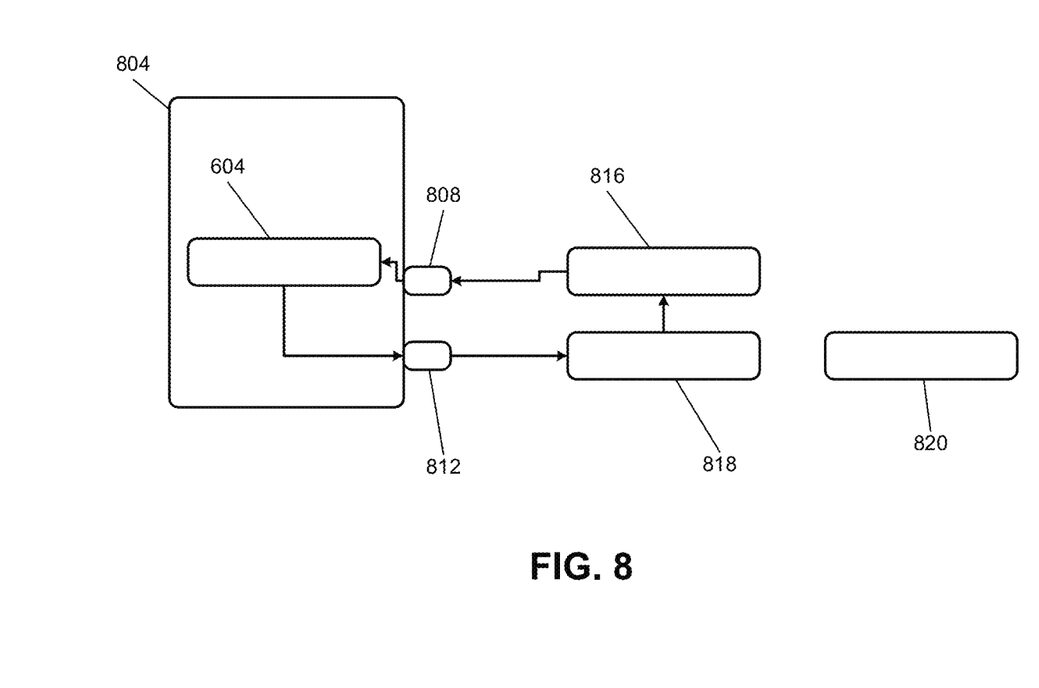
FIG. 8 includes a functional block diagram of an example motor and coolant system.

FIG. 8 includes a functional block diagram of an example motor and coolant system. As stated above, the stator (including the stator windings 604) and rotor(s) of the axial flux motor are disposed within a housing 804. An inlet 808 and an outlet 812 are disposed on exterior of the housing 804 and are fluidly connected to the channels (e.g., 712) through the windings 604.

A pump 816 (e.g., an electric pump) pumps coolant through the stator windings 604. For example, the pump 816 may pump coolant to the inlet 808 and draw coolant out from the stator windings 604 via the outlet 812. A heat exchanger 818 may be implemented to facilitate transfer of heat away from the coolant, such as to air. In various implementations, one or more fans 820 may be implemented to increase airflow past/through the heat exchanger 818.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) or material that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A vehicle system comprising:
an axial flux motor comprising:
    a stator having a first side and a second side opposite the first side, the stator comprising:
        N stator core components on the first side, wherein N is an integer greater than two;
        N stator windings that are disposed around the N stator core components, respectively,
        wherein each of the N stator windings includes, from a point of view facing the first side:
            a first width at a first location; and
            a second width that is greater than the first width at a second location that is radially outward from the first location relative to an axis through the stator;
        slot openings disposed between adjacent ones of the stator windings; and
    a rotor including a third side and M permanent magnets on the third side,
    wherein the first side is parallel to the third side, and
    wherein M is an integer greater than or equal to two,
        wherein a distance between adjacent ones of the stator windings is constant from an inner diameter of the stator windings to an outer diameter of the stator windings.

2. The vehicle system of claim 1 wherein each of the N stator windings further includes, from the point of view, a third width that is greater than the second width at a third location that is radially outward from the second location relative to the axis.

3. The vehicle system of claim 1 wherein each of the N stator windings, from the point of view, increases in width in a direction radially outwardly from the axis.

4. The vehicle system of claim 1 wherein the N stator windings are three dimensionally printed.

5. The vehicle system of claim 1 wherein the N stator windings are rolled.

6. The vehicle system of claim 1 wherein the N stator windings include coolant channels through the N stator windings.

7. The vehicle system of claim 6 further comprising:
a pump configured to pump a coolant through the coolant channels.

8. The vehicle system of claim 7 further comprising a heat exchanger configured to increase heat transfer away from the coolant.

9. The vehicle system of claim 1 wherein the N stator core components include trapezoidal faces and a thickness between the trapezoidal faces.

10. The vehicle system of claim 1 wherein the N stator core components are arranged in a circle around the axis.

11. A vehicle system including:
a stator for an axial flux electric motor, the stator comprising:
a stator body having a first side and a second side opposite the first side;
N stator core components disposed on the first side, wherein N is an integer greater than two;
N stator windings that are disposed around the N stator core components, respectively,
wherein each of the N stator windings includes, from a point of view facing the first side:
a first width at a first location; and
a second width that is greater than the first width at a second location that is radially outward from the first location relative to an axis through the stator body; and
slot openings disposed between adjacent ones of the stator windings,
wherein a distance between adjacent ones of the stator windings is constant from an inner diameter of the stator windings to an outer diameter of the stator windings.

12. The vehicle system of claim 11 wherein each of the N stator windings further includes, from the point of view, a third width that is greater than the second width at a third location that is radially outward from the second location relative to the axis.

13. The vehicle system of claim 11 wherein each of the N stator windings, from the point of view, increases in width in a direction radially outwardly from the axis.

14. The vehicle system of claim 11 wherein the N stator windings are three dimensionally printed.

15. The vehicle system of claim 11 wherein the N stator windings are rolled.

16. The vehicle system of claim 11 wherein the N stator windings include coolant channels through the N stator windings.

17. The vehicle system of claim 16, further comprising a pump configured to pump coolant through the coolant channels.

18. The vehicle system of claim 11 wherein the N stator core components include trapezoidal faces and a thickness between the trapezoidal faces.

19. The vehicle system of claim 11 wherein the N stator core components are arranged in a circle around the axis.

* * * * *